United States Patent Office 3,317,633
Patented May 2, 1967

3,317,633
POLYOLEFINS OF IMPROVED DYE AFFINITY MODIFIED WITH UNSATURATED POLYESTER RESINS
Giuliana C. Tesoro, Dobbs Ferry, N.Y., and Wing Kai Lee, Lyndhurst, and Donald R. Moore, Washington Township, Bergen County, N.J., assignors to J. P. Stevens & Co., Inc., New York, N.Y., a corporation of Delaware
No Drawing. Filed Apr. 1, 1964, Ser. No. 356,663
13 Claims. (Cl. 260—873)

The present invention relates to modified polyolefins and also relates to methods for producing same. The invention relates more particularly to a method for modifying polypropylene to enhance its dye receptivity.

Synthetic fibers made from polyolefins have many desirable properties, and have been studied extensively as components of textile products. However, the chemical inertness of polyolefins has prevented more widespread usage of these advantageous polymers. For example, the chemical inertness of the polyolefins precludes dyeing and coloring these materials with dyes which are applicable to natural fibers and certain synthetic fibers. Even when the polyolefins can be colored to satisfactory shades, for example by using selected oil-soluble or dispersed dyes, the absence of any affinity between the dye and the fiber results in inadequate colorfastness properties, particularly with respect to dry cleaning.

In an effort to overcome the inability of polyolefins to be satisfactorily dyed, several procedures have been suggested. These have been based, for example, on the addition of metal-containing compounds to the polyolefin before spinning, on the use of special dyes, and on chemical modifications of the polyolefin such as sulfation. Combinations of one or more of these approaches have also been suggested. Although the work in this field has resulted in significant improvements in the reactivity and dyeability of polyolefins, none of the processes thus far developed is free from undesirable or impractical features, and there remains a real need for a process which will provide dyed polyolefins which meet all the requirements including good colors, colorfastness and the like.

Accordingly, it is an object of this invention to provide a method of modifying polyolefins to enhance the reactivity and the dye receptivity thereof.

It is another object of this invention to provide modified polyolefins which have enhanced dye receptivity.

It is a further object of this invention to provide modified polypropylene which has enhanced dye receptivity.

It is another object of this invention to modify polyolefins by the combination therewith of a polar substance thereby altering the chemical nature of the polyolefin.

Briefly stated, one embodiment of the present invention is a method of producing dye-receptive polypropylene comprising the steps of adding to said polypropylene an unsaturated polester in which each of the repeating units contains a linkage selected from the group consisting of

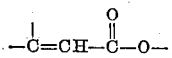

and

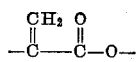

blending said polypropylene and said polyester to form a substantially homogenous mixture, melt-spinning the mixture to form fiber filaments, and treating the said filaments with a polar compound capable of reacting with said polyester by addition across said carbon-to-carbon double bond.

The first step in modifying a polyolefin in accordance with the method of this invention involves forming a mixture of the polyolefin and an unsaturated polyester. This first step is conveniently performed in two stages. First, the desired proportions of the polyolefin and unsaturated polyester are physically combined to form a heterogeneous mixture. This may be accomplished, for example, by mixing particles of the polyester with particles of the polyolefin. Alternatively, the polyester may be dissolved in a low-boiling solvent, and the solution then sprayed onto particles of the polyolefin.

The second stage of the mixing step is intended to form a substantially homogenous mixture of the polyolefin and the polyester. This may be conveniently accomplished, for example, by blending at a temperature sufficiently high to soften both the polyolefin and the polyester, thereby facilitating substantially complete mixing of the two components. It is preferable to obtain substantially complete mixing of the two components so as to approach a macromolecular composition.

Next, the blended composition is extruded to provide the desired physical form of the modified polyolefin. For example, if the modified polyolefin is to be converted into textile fibers, the blended composition is melt-spun into filaments which are then drawn and otherwise treated in a conventional manner to form suitable fibers.

The next major step of the method of the present invention involves reacting the blended composition of polyolefin and unsaturated polyester with a polar compound capable of reacting with the polyester by addition across the unsaturated linkages therein.

The unsaturated polyesters suitable for use in the present invention contain repeating units characterized by the presence of a carbon-to-carbon double bond in a position alpha-beta to a carboxylic carbon atom. Thus, for example, a polyester formed by polycondensation of a glycol with an unsaturated dicarboxylic acid can be used in the present invention provided the acid contains one of the following structures:

  (1)

  (2)

If the polyester is formed using only unsaturated dicarboxylic acids containing one of the above structures, then each of the repeating units of the polyester will contain a carbon-to-carbon double bond in a position alpha-beta to a carboxylic carbon atom. If for some reason it is desired to use a saturated dicarboxylic acid, for example, in combination with an unsaturated dicarboxylic acid of the type described above, then some of the repeating units of the polyester will contain an alpha-beta carbon-to-carbon double bond, whereas other repeating units will not contain such a structure.

The desirability of choosing an unsaturated dicarboxylic acid containing a structure as set forth above in Formula 1 or Formula 2 stems from the enhanced chemical reactivity of a carbon-to-carbon double bond so located.

As indicated above, the ultimate objective to be achieved by this step of the method of the present invention is the incorporation of a polar compound into the blend by reaction with the polyester. In this manner, the chemical character of the blend is modified by imparting a polar character thereto. After such treatment, the blend or modified polyolefin is far more reactive than the original polyolefin, and the blend is capable of reacting with many compounds including ionic dyes, for example.

A typical polar additive is a primary amine and its reaction with the unsaturated polyester portion of the blend proceeds as follows. For purposes of illustration, assume that a repeating unit of the polyester is expressed by the following formula:

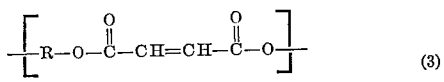
(3)

where R is a divalent hydrocarbon radical which originally was part of the glycol used in forming the polyester. Assume that the amine used is propyl amine. The reaction of the propyl amine with the polyester proceeds as follows:

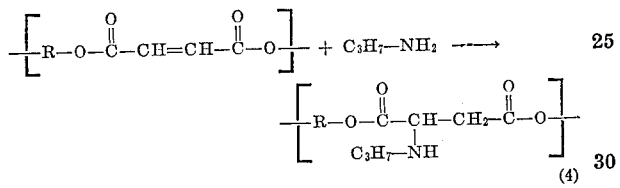
(4)

As shown above in Equation 4, one of the hydrogen atoms of the amine group adds to one of the carbons forming the double bond, and the balance of the amine adds to the other carbon. The reaction shown in Equation 4 does not require the use of a catalyst, and for this reason amines in general are the preferred type of polar compound for use in this invention.

The modified polyolefin, after treatment with a polar compound, has chemical properties substantially different from those exhibited by the polyolefin in its pure state. Accordingly, the modified polyolefin is capable of reacting with substances to form new combinations which were not possible to obtain with the polyolefin itself. Outstanding in this respect is the excellent dye receptivity which is imparted to the polyolefin by treatment in accordance with the present invention.

Set forth below are examples which illustrate the effectiveness of the method of the present invention in changing the chemical characteristics of polyolefin.

Example 1

A physical mixture of polypropylene and a polyester having repeating units of the following formula:

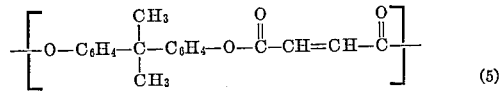
(5)

was prepared. The polyester is sold commercially by Atlas Chemical Industries, Inc., under the trade name "Atlac 382E" and has an acid number of 27. The polyester, which is a solid at room temperature, was dissolved in acetone, and the solution thus formed was sprayed onto polypropylene pellets. The polypropylene pellets were 3 mm. x 3 mm. x 1.5 mm. in size and are sold under the trade name "Escon 105." The polypropylene had a molecular weight ($\bar{M}v$) of approximately $2.45 \times 10^5$ and $[\eta]$ of 2.04. The proportions of polyester and polypropylene were chosen to provide a mixture which was 95% by weight of polypropylene and 5% by weight of the polyester.

The treated polypropylene pellets were air dried to remove the acetone. The mixture was then melt-spun in the conventional manner to form filaments and the filaments were drawn and converted into a knitted fabric.

Two samples of the fabric were then immersed in a solution of 100 parts (by weight) of $CH_3CN$ containing one part of bis(2-mercaptoethyl) piperazine, maintained at a temperature of 80° C. After one hour, one sample of fabric was removed from the solution and was washed in fresh $CH_3CN$ and dried.

After two hours, the second sample of fabric was removed from the solution and washed and dried as above.

Both samples and a fabric made of unmodified polypropylene were dyed in an aqueous solution of Polar Red 3B (Acid Red 134) at a boil for one hour. The two samples of modified polypropylene were dyed to a bright medium shade while the unmodified polypropylene sample was not dyed at all.

Example 2

A fabric was formed of modified polypropylene made in accordance with the steps set forth in Example 1 except that an unsaturated polyester having repeating units of the following formula:

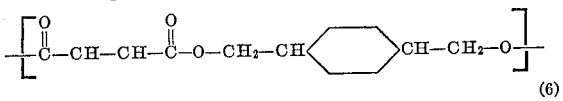
(6)

was substituted for the polyester previously used.

Two samples of the fabric were then treated as in Example 1, and subsequently dyed in accordance with the method set forth in Example 1.

The two samples of modified polypropylene were dyed to a medium shade.

Example 3

A fabric was formed from polypropylene modified in accordance with the method of Example 1, and another fabric was formed from polypropylene modified in accordance with the method of Example 2.

Samples of the two fabrics were immersed in 300 parts (by weight) of $CH_3CN$ containing 4 parts bis(2-mercaptoethyl) piperazine. The solution was maintained at 80° C. and the samples were immersed for a period of two hours.

The fabric samples were washed in a 10% acetic acid solution and in water and dried.

Samples of the two fabrics were dyed to a medium-deep shade with the following water-soluble dyes at a boil for one hour.

| | | C.I. No. |
|---|---|---|
| Acid dyes: | | |
| (1) Poncacyl East Black N2B | | Acid Black 26–A. |
| (2) Amacid Cloth Red B Ex. | | Acid Red 115. |
| (3) Alizarine Cyanine Green GWA | | Acid Green 44. |
| Acid mordants: | | |
| (4) Pontachrome Black TA | | Mordant Black 2. |
| (5) Acid Alizarine Bordeaux BLT | | Mordant Red 6. |
| (6) Acid Anthracene Brown KE | | Mordant Brown 15. |
| (7) Pontachrome Grey GL | | Mordant Black 38. |
| (8) Calcochrome Green BB | | Mordant Green 11. |
| (9) Pontachrome Fast Yellow R | | Mordant Yellow 16. |
| Pre-metallized: | | |
| (10) Vialon Blue Grey B | | Acid Black 61. |
| (11) Vialon Fast Brown R | | Acid Brown 50. |
| (12) Vialon Fast Green FFG | | Acid Green 46. |
| (13) Vialon Fast Orange R | | Acid Orange 89. |
| (14) Vialon Fast Red B | | Acid Red 225. |
| (15) Vialon Fast Violet B | | Acid Violet 74. |
| (16) Vialon Fast Yellow G | | Acid Yellow 118. |
| (17) Pontachrome Black PV | | Mordant Black 9. |
| (18) Amacid Chrome Red 3B Conc. | | Acid Red 66. |

Example 4

A fabric was formed from polypropylene modified in accordance with the method of Example 1, and another fabric was formed from polypropylene modified in accordance with the method of Example 2.

Samples of the two fabrics were treated by immersion in 300 parts of $CH_3CN$ containing 4 parts (by weight) of bis(2-mercaptoethyl) piperazine. The solution was maintained at a temperature of 80° C. and samples were immersed for a period of two hours. The samples were washed in a 10% aqueous acetic acid solution and in water and then dried.

Samples of the two fabrics were then dyed with Eastman Yellow 5R (Dispersed Yellow 23) to a deep shade. The samples dyed showed good colorfastness when treated with perchloroethylene, a conventional dry-cleaning solvent.

Samples of fabrics made as set forth above, but which were not treated with the solution containing bis(2-mercaptoethyl) piperazine were dyed using the following dispersed dyes.

| Dispersed dyes: | C.I. No. |
|---|---|
| Eastman Yellow 5R | Dispersed Yellow 23. |
| Celanthrene Violet BGF | Dispersed Blue 8. |
| Amacel Golden Orange 3G | Dispersed Orange 15. |

The fabric samples dyed to a medium shade with each of the above dyes. None of the samples were colorfast when treated with dry-cleaning solvent.

Fabric samples of unmodified polypropylene, when treated with the above dyes, were only slightly tinted.

Example 5

A modified polypropylene was prepared in accordance with the following procedure. One hundred parts by weight of polypropylene pellets (molecular weight ($\bar{M}v$) $2.45 \times 10^5$, [$\eta$] 2.04, pellet size 3 mm. x 3 mm. x 1.5 mm., sold under the name "Escon 105") were mechanically mixed with six parts by weight of a polyester having the following formula:

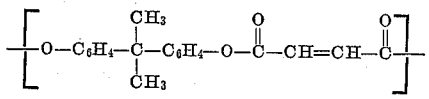

The polyester was in the form of a 40 mesh powder, had an acid number of 27, and was of the type under the name "Atlac 382E."

The mixture of polypropylene and polyester was then blended in a Banbury mixer at a temperature of 450° F. The blend was melt-extruded at 450° F. and pelletized.

The modified polypropylene pellets were then melt-spun into filaments suitable for use in fabric construction. The filaments were processed by drawing and finally converted into knitted fabric.

One sample of the fabric was immersed in a solution formed of one hundred parts (by weight) $CH_3CN$ and five parts bis(2-mercaptoethyl) piperazine. The fabric sample was kept immersed in the solution for a period of two hours, the solution being at ambient temperature which was approximately 70° F.

The treated fabric sample was then washed in $CH_3CN$ followed by washing in water. The sample was then dyed to a deep shade with Polar Red 3B.

Another sample of fabric of the type described above was treated by immersion in a solution formed of one hundred parts carbon tetrachloride (by weight) and five parts bis(2-mercaptoethyl) piperazine. The balance of the treatment was the same as above, and the fabric sample dyed to a deep shade with Polar Red 3B.

Example 6

Fabric samples, prepared from modified polypropylene as described in Example 5, were treated in a manner identical with that set forth in Example 5 except that piperazine was substituted for bis(2-mercaptoethyl) piperazine.

Both samples of fabric (the one immersed in the $CH_3CN$-base solution and the one immersed in the carbon tetrachloride-base solution) were dyed to a deep shade with Polar Red 3B.

Example 7

Fabric samples made from modified polypropylene as described in Example 5, were treated in an identical manner with the procedure of Example 5 except that N,N'-bis(1-methylheptyl) ethylene diamine was substituted for the bis(2-mercaptoethyl) piperazine.

The two samples of fabric were dyed to a light shade with Polar Red 3B.

Example 8

A sample of fabric made from modified polypropylene as described in Example 5, was treated in the following manner. The fabric sample was immersed in a solution formed of one hundred parts $CH_3CN$ (by weight) and ten parts ammonia. The sample was kept immersed for two hours, the solution being maintained at room temperature which was approximately 70° F.

The treated sample was washed with $CH_3CN$ and then in water. The sample was dyed to a light shade with Polar Red 3B.

Example 9

Fabric samples, made from modified polypropylene as described in Example 5, were treated as follows. Four different solutions were made consisting of one part, three parts, five parts and ten parts piperazine per one hundred parts by weight of $CH_3CN$ respectively. Three samples of fabric were initially immersed in each of the four solutions. Samples were withdrawn from the solutions at various time intervals.

After withdrawing each sample, it was washed with $CH_3CN$, then washed in water, and dyed with Polar Red 3B at a boil for a period of one hour. The results of the above procedure are summarized in the table below:

| Piperazine Concentration (Parts by weight) | Time of Treatment (minutes) | Results of Dying |
|---|---|---|
| 1 | 30 | No improvement. |
|  | 60 | Light shade. |
|  | 120 | Do. |
| 3 | 30 | Medium shade. |
|  | 60 | Do. |
|  | 120 | Do. |
| 5 | 30 | Do. |
|  | 60 | Do. |
|  | 120 | Deep shade. |
| 10 | 60 | Do. |
|  | 120 | Do. |
|  | 240 | Do. |

The procedure described above was repeated using the solution containing three parts piperazine per one hundred parts $CH_3CN$ respectively except that the solution was maintained at 50° C. during the treatment. The samples dyed to a medium shade with Polar Red 3B.

Example 10

Fabric samples made from modified polypropylene in accordance with the procedure of Example 5 were treated as follows. Separate solutions were formed of five parts by weight of the following ten amino compounds in $CH_3CN$:

| Amino Compounds | Formulas |
| --- | --- |
| (1) Bis(2-mercaptoethyl) piperazine | HSCH₂CH₂N⟨⟩NCH₂CH₂SH |
| (2) Piperazine | HN⟨⟩NH |
| (3) 1,3-diaminopropane | H₂N(CH₂)₃NH₂ |
| (4) 2-diethylamino ethanethiol | HSCH₂CH₂N(C₂H₅)₂ |
| (5) 2-mercaptoethylamine | HSCH₂CH₂NH₂ |
| (6) Imino-bis-propylamine | H₂N(CH₂)₃NH(CH₂)₃NH₂ |
| (7) Hexamethylene diamine | H₂N(CH₂)₆NH₂ |
| (8) Dimethylaminopropylamine | (CH₃)₂N(CH₂)₃NH₂ |
| (9) N-aminoethylpiperazine | H₂NC₂H₄N⟨⟩... |
| (10) 1,4-cyclohexane bis(methylamine) | H₂NCH₂CH⟨⟩CHCH₂NH₂ |

Each of the solutions was used to treat a separate sample of fabric. The fabrics were immersed in the respective solutions for a period of two hours, the solutions all being kept at room temperature which was 70° F. After treatment, the samples were washed in CH₃CN and then in water. Each of the samples were dyed to a deep shade with Polar Red 3B at a boil for one hour.

A group of fabric samples was treated with a solution containing amino compound (1) from the above table, and a second group of samples was treated with a solution containing amino compound (6). The two sets of fabric samples were immersed in 5% by weight of the two respective amines in CH₃CN for a period of two hours, the solutions being kept at room temperature (70° F.). After the treatment, the samples were washed in CH₃CN and then in water.

Samples of both groups were dyed to a deep shade using each of the dyes listed in Example 3.

*Example 11*

A group of fabric samples prepared from the modified polypropylene made in accordance with the procedure of Example 5, was treated as follows. The samples were padded with an aqueous solution containing fifteen parts by weight of imino-bis-propylamine. The padded fabrics were heated to a temperature of 220° F. for a period of ten minutes. The fabrics were then washed in 10% acetic acid to remove unreacted amine, and then thoroughly washed in water.

The samples of fabric were dyed to a deep shade using each of the dyes set forth in Example 3.

*Example 12*

Samples of fabric, made from modified polypropylene produced in accordance with the method of Example 5 were treated as follows. A first group of samples was immersed in a solution formed of five parts by weight bis(2-mercaptoethyl) piperazine in CH₃CN, and a second group of samples was immersed in a solution formed from five parts by weight of imino-bis-propylamine in CH₃CN. The samples were held in the solutions for two hours at 70° F.

The treated samples were then washed in CH₃CN, followed by washing in water.

Samples of fabric from both groups were dyed to a deep shade 1% (by weight of the fabric, at a boil) of the following pre-metallized dyes.

| Dye: | C.I. No. |
| --- | --- |
| Vialon Fast Yellow G | Acid Yellow G. |
| Vialon Fast Brown R | Acid Brown 50. |
| Vialon Fast Orange R | Acid Orange 89. |
| Amacid Chrome Red 3B Conc. | Acid Red 66. |

The dyed samples showed good washfastness, excellent dry-cleaning fastness, crock fastness and adequate light fastness.

The unsaturated polyesters which are suitable for use in the present invention are typically synthesized by reacting a diol with an unsaturated dibasic acid. Alternatively, the anhydride ester or acid chloride form of the unsaturated dibasic acid may be used.

The unsaturated polyesters which are used in the present invention are preferably solid at room temperature, have low acid numbers and high iodine numbers. Of course, compatibility with the particular polyolefin to be modified is important in order to assure a homogenous blend. Some typical unsaturated polyesters which may be used in accordance with the present invention are as follows:

(1) $$\left[\text{COCH}=\text{CHCOOCH}_2\underset{\underset{\text{CH}_3}{|}}{\text{CH}}-\text{CH}_2\text{CH}_2\text{O}\right]_x$$

(2) $$\left[\text{COCH}=\text{CHCOO(CH}_2)_{10}-\text{O}\right]_x$$

(3) $$\left[\text{COCH}=\text{CHCOOCHCH}\underset{\text{CH}_2-\text{CH}_2}{\overset{\text{CH}_2-\text{CH}_2}{\diagup\diagdown}}\text{CH}-\text{CH}_2-\text{O}\right]_x$$

(4) $$\left[\text{COC}_6\text{H}_4\text{COO(CH}_2)_n-\text{OCOCH}=\text{CH}\overset{\text{O}}{\underset{||}{\text{C}}}-\text{O}-(\text{CH}_2)_n\text{O}-\overset{|}{\underset{\underset{-\text{O}-\overset{||}{\text{C}}-\text{CH}}{}}{}}\right]_x$$

(5) $$\left[\text{OC}_6\text{H}_4\underset{\underset{\text{CH}_3}{|}}{\overset{\overset{\text{CH}_3}{|}}{\text{C}}}-\text{C}_6\text{H}_4\text{OCOCH}=\text{CHCO}\right]_x$$

(6) $$\left[\text{COOC}\underset{\underset{\text{CH}_2}{||}}{}-\text{CH}_2\text{COO(CH}_2)_4\text{O}\right]_x$$

(7) $$\left[\text{COCH}=\text{CH}\overset{\text{O}}{\underset{||}{\text{C}}}-\text{O}-\text{CH}_2\text{C}_6\text{H}_4\text{CH}_2\text{O}\right]_x$$

In the above table, $n$ is a number from 2 to 10, and $x$ represents the number of repeating units present in the UPE.

Commercially available unsaturated polyesters such as "Oronite 5500," "Oronite 5511," "Reichhold SMA-48" and "Reichhold 80001 Alkyd" may also be used.

Cross-linked unsaturated polyesters such as those formed by reaction of an unsaturated dibasic acid with a triol cannot be melt-spun. For this reason, they are not suitable for use in preparing filaments or fibers. From the standpoint of ease of filament-spinning, linear unsaturated polyesters are preferred over the branched types.

The advantages of modifying polyolefin by incorporation of an unsaturated polyester increase in proportion to the amount of the polyester present. However, the use of a large amount of the polyester is undesirable since the basic nature of the blend will become more like that of a polyester and less like that of a polyolefin. One percent by weight of unsaturated polyesters is a practical lower limit since it is difficult to detect any appreciable change when lower proportions are used. A preferable practical upper limit of unsaturated polyester is approximately 20 percent by weight. As indicated above, the use of proportions of polyester substantially greater than 20% will tend to mask the desired advantages attributable to the polyolefin.

The blending of the polyolefin and the polyester is conducted at a temperature sufficiently high to permit good mixing. The objective of this step is to provide a substantially homogenous blend.

As discussed above, the polar compound used in the present method reacts with the unsaturated polyester by adding across a double bond. Thus, for example, in those polar compounds in which the reactive group contains an active hydrogen, the active hydrogen adds to one of the carbons forming the double bond, and the balance of the polar compound adds to the other carbon.

Polar compounds in which the reactive group is of the amino type are preferred because reaction with the polyester takes place without the necessity of using a catalyst. This preferred group of compounds includes primary amines which have the general formula $$R—NH_2 \quad (7)$$

in which R may be a substituted or unsubstituted alkyl radical, an alkylaryl radical or an aryl radical. Examples of primary amines suitable for use in this invention are the saturated aliphatic amines containing from 3 to 20 carbon atoms, alkylaryl amines such as benzylamine, aliphatic cyclic amines such as cyclohexylamine, aromatic amines such as aniline, substituted aliphatic amines such as hydroxyalkyl amines and mercapto amines, amino carboxylic acids and the like.

Secondary amines having the formula

(8)

in which R and R' may be substituted or unsubstituted alkyl, alkylaryl or aryl radicals, may also be used. In this category also are included acyclic amines and heterocyclic amines. Examples of the latter type are ethylene imine, propylene imine, pyrrolidine, piperazine, and hexamethylene imine.

Polyamines and ammonia are also suitable for use in this phase of the present invention.

Another type of polar compound having an active hydrogen is the mercaptan family of compounds. Included in this group are aliphatic, aromatic and alkylaryl mercaptans. Substituted mercaptans such as hydroxymercaptans, amino mercaptans and mercapto esters also are suitable.

Substituted mercapto compounds such as N-mercaptoalkylamines and bis-N-mercaptoalkylamines can also be used. Polymercaptans may also be reacted with the unsaturated polyesters of this invention.

When using the mercapto type of polar compound it is necessary to use a basic type of catalyst in order to create the necessary conditions for reaction. Such typical basic catalysts as triethylamine, pyridine, and sodium carbonate may be used.

In addition to the above recognized groups of polar compounds, many other well known polar compounds may be used in the present invention. These include inorganic compounds having an active hydrogen such as alkali bisulphite, halogen acids and phosphoric and phosphorous acids. In addition, hydrogen sulphide, halogens, sulphur and nitrogen oxides may be reacted with the unsaturated polyesters.

Organic compounds which are within the class suitable for use in the present invention include compounds containing activated methylene groups and diazo compounds.

When treating the modified polyolefin with a polar compound, it is preferable to utilize a solvent which is capable of causing swelling of the polyolefin. Typical examples of such solvents are acetonitrile, carbon tetrachloride, hexane and toluene. The use of such a swelling solvent aids in diffusing the polar compounds into the interior of the modified polyolefin, thereby increasing the number of available sites for reaction of the polar compound with the unsaturated polyester.

Water can be used but requires elevated temperatures in order to approach the results obtainable with the other solvents.

The amount of polar compound to be reacted with the modified polyolefin can be varied within a wide range. Obviously, the results obtained are directly proportional to the amount of polar compound incorporated into the modified polyolefin. Accordingly, amounts of from about 1% to 100% of polar compound based on the weight of modified polyolefin can be used. However, it is generally desirable to use at least 3% in order to impart polar properties.

Preferably, the concentration of the polar compound in the solvent should be in the range of from 1% to 10% by weight. Below 1%, the time for reaction is increased beyond a practical limit. Concentrations greater than 10% can be used, but there is no substantial advantage to be gained thereby.

The time of treatment of the modified polyolefin with the polar compound and the temperature of the reaction medium depends upon many factors such as the proportion of polyester in the blend, the iodine number of the polyester, the chemical reactivity of the polar compound and the like. For this reason it is not possible to specify preferred times and temperatures. Generally, the time will vary from a few minutes to several hours at temperatures ranging from ambient up to 100° C.

The types of dyes giving excellent results on the modified polyolefins prepared according to the processes of the present invention are of the ionic type and depend specifically on the identity of the polar groups introduced. Treatment with polar compounds containing amino groups will give excellent dyeability with acid and acid metallized dyes. Treatment with compounds containing carboxyl groups will give dyeability with basic (cationic) dyes. The presence of hydroxyl or thiol groups in the modified polyolefin will insure dyeability with fiber reactive dyes. Dyeability with direct and dispersed dyes, and particularly colorfastness properties are also enhanced by the inclusion of polar compounds.

The term "polyolefin" as used in the specification and appended claims is intended to denote a linear head-to-tail polymerizate of an alpha-olefin which contains a high percentage of isotactic macromolecules.

The illustrative examples described above specify that the polyester is treated with a polar compound subsequent to the mixing of the polyester with the polyolefin. This is because the polar compound addition to the polyester changes the chemical nature of the polyester, and thereby complicates the blending of the polyester with the polyolefin. However, in certain cases it is possible without too much difficulty to obtain a homogeneous blend of a polyolefin with a polyester previously reacted with a polar compound. In these instances, it may be preferable to react the polyester with a polar compound prior to blending with the polyolefin since the overall process is thereby simplified.

It is to be understood that the invention described above may be varied by one skilled in the art without departing from the spirit and scope of this invention.

What is claimed is:

1. The method of modifying a poly-alpha-olefin comprising the steps of adding to said poly-alpha-olefin a polyester in which at least a proportion of the repeating units of said polyester contains a carbon-to-carbon double bond located in a position alpha-beta to a carboxylic carbon atom, blending said poly-alpha-olefin and said polyester to form a substantially homogeneous mixture, and reacting said polyester in said mixture with a polar compound selected from the group consisting of ammonia, primary amines, secondary amines, polyamines, mercaptans, amino-mercaptans, polymercaptans, inorganic compounds selected from the class consisting of alkali bisulphite, halogens, halogen acid, phosphoric acid, phosphorous acid, hydrogen sulphide, sulfur and nitrogen oxide, and organic compounds having activated groups selected from the class consisting of diazo and methylene, whereby said polar compound is added across the carbon-to-carbon double bond of said polyester.

2. A method of modifying a poly-alpha-olefin comprising the steps of adding to said poly-alpha-olefin a polyester in which at least a proportion of the repeating units contain a linkage selected from the group consisting of

and

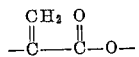

blending said poly-alpha-olefin and said polyester to form a substantially homogeneous mixture, and reacting said polyester in said mixture with a polar compound selected from the group consisting of ammonia, primary amines, secondary amines, polyamines, mercaptans, amino-mercaptans, polymercaptans, inorganic compounds selected from the class consisting of alkali bisulphite, halogens, halogen acid, phosphoric acid, phosphorous acid, hydrogen sulphide, sulfur and nitrogen oxide, and organic compounds having activated groups selected from the class consisting of diazo and methylene, whereby said polar compound is added across the carbon-to-carbon double bond of said polyester.

3. The method of preparing a dye-receptive poly-alpha-olefin comprising the steps of adding to said poly-alpha-olefin a polyester in which at least a proportion of the repeating units contain a linkage selected from the group consisting of

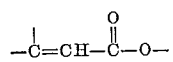

and

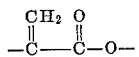

blending said poly-alpha-olefin and said polyester to form a substantially homogeneous mixture, extruding said mixture to produce a desired physical form and reacting said polyester in said desired physical form with a polar compound selected from the group consisting of ammonia, primary amines, secondary amines, polyamines, mercaptans, amino-mercaptans, polymercaptans, inorganic compounds selected from the class consisting of alkali bisulphite, halogens, halogen acid, phosphoric acid, phosphorous acid, hydrogen sulphide, sulfur and nitrogen oxide, and organic compounds having activated groups selected from the class consisting of diazo and methylene, whereby said polar compound is added across the carbon-to-carbon double bond of said polyester.

4. The method of producing dye-receptive polypropylene comprising the steps of adding to said polypropylene a polyester in which each of the repeating units contains a linkage selected from the group consisting of

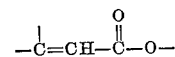

and

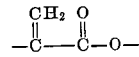

blending said polypropylene and said polyester to form a substantially homogeneous mixture, melt-spinning the mixture to form fiber filaments, and reacting said polyester in the said filaments with a polar compound selected from the group consisting of ammonia, primary amines, secondary amines, polyamines, mercaptans, amino-mercaptans, polymercaptans, inorganic compounds selected from the class consisting of alkali bisulphite, halogens, halogen acid, phosphoric acid, phosphorous acid, hydrogen sulphide, sulfur and nitrogen oxide, and organic compounds having activated groups selected from the class consisting of diazo and methylene, whereby said polar compound is added across the carbon-to-carbon double bond of said polyester.

5. The method of claim 4 in which said filaments are contacted with a solvent suitable for swelling said polypropylene while said filaments are being reacted with said polar compound.

6. A composition of matter comprising a poly-alpha-olefin and the reaction product of (1) a polyester prepared by the condensation reaction of an unsaturated dicarboxylic acid and a diol at least a proportion of the repeating units of said polyester having a carbon-to-carbon double bond located in a position alpha-beta to a carboxylic carbon atom, and (2) a polar compound selected from the group consisting of ammonia, primary amines, secondary amines, polyamines, mercaptans, amino-mercaptans, polymercaptans, inorganic compounds selected from the class consisting of alkali bisulphite, halogens, halogen acid, phosphoric acid, phosphorous acid, hydrogen sulphide, sulfur and nitrogen oxide, and organic compounds having activated groups selected from the class consisting of diazo and methylene, the polar component of said polar compound having reacted with the polyester by addition across the carbon-to-carbon double bond.

7. The composition of matter of claim 6, in which the polar compound is an amino-mercaptan.

8. The composition of matter of claim 6 in which the polar compound is a primary amine selected from the class consisting of N,N'-bis(1-methyl heptyl) ethylene diamine, 1,3-diaminopropane, imino-bis-propylamine, hexamethylenediamine, dimethylaminopropylamine, N-aminoethyl piperazine, and 1,4-cyclohexane-bis-(methylamine).

9. The composition of matter of claim 6 in which the polar compound is the secondary amine: piperazine.

10. The composition of matter of claim 7, in which the polyolefin is polypropylene.

11. The composition of matter of claim 7 in which the amino-mercaptan is bis(2-mercaptoethyl) piperazine.

12. The composition of matter of claim 7 in which the amino-mercaptan is 2-diethylaminoethanethiol.

13. The composition of matter of claim 7 in which the amino-mercaptan is 2-mercaptoethylamine.

References Cited by the Examiner

UNITED STATES PATENTS

| 2,744,086 | 5/1956 | Mowry et al. | 260—873 |
| 3,256,362 | 6/1966 | Craubner et al. | 260—873 |

FOREIGN PATENTS

| 1,303,982 | 8/1962 | France. |
| 893,605 | 4/1962 | Great Britain. |

MURRAY TILLMAN, *Primary Examiner.*

SAMUEL BLECH, J. T. GOOLKASIAN,
*Assistant Examiners.*